United States Patent
Chen

(10) Patent No.: US 7,418,589 B2
(45) Date of Patent: Aug. 26, 2008

(54) SYSTEM AND METHOD FOR UPDATING A BASIC INPUT/OUTPUT SYSTEM

(75) Inventor: Ting-Hsien Chen, Guangdong (CN)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 362 days.

(21) Appl. No.: 11/162,687

(22) Filed: Sep. 19, 2005

(65) Prior Publication Data

US 2006/0117171 A1   Jun. 1, 2006

(30) Foreign Application Priority Data

Nov. 26, 2004   (TW)   ............... 93136472 A

(51) Int. Cl.
  G06F 9/00    (2006.01)
  G06F 9/24    (2006.01)
  G06F 15/177  (2006.01)

(52) U.S. Cl. ............................. 713/2; 713/1
(58) Field of Classification Search ............ 713/1, 713/2
  See application file for complete search history.

(56) References Cited

U.S. PATENT DOCUMENTS

| 5,964,873 | A   |   | 10/1999 | Choi |  |
|---|---|---|---|---|---|
| 6,122,733 | A   |   | 9/2000  | Christeson et al. |  |
| 6,357,021 | B1  | * | 3/2002  | Kitagawa et al. | 714/41 |
| 6,930,785 | B1  | * | 8/2005  | Weyand et al. | 358/1.1 |
| 7,093,244 | B2  | * | 8/2006  | Lajoie et al. | 717/168 |
| 7,246,266 | B2  | * | 7/2007  | Sneed et al. | 714/27 |
| 2002/0114384 | A1 | * | 8/2002  | Nelson et al. | 375/222 |
| 2002/0147941 | A1 | * | 10/2002 | Gentile | 714/36 |
| 2003/0106051 | A1 | * | 6/2003  | Morrison et al. | 717/170 |
| 2003/0106052 | A1 | * | 6/2003  | Morrison et al. | 717/170 |
| 2004/0103347 | A1 | * | 5/2004  | Sneed et al. | 714/32 |
| 2004/0103412 | A1 | * | 5/2004  | Rao et al. | 717/171 |
| 2005/0229173 | A1 | * | 10/2005 | Mihm et al. | 717/171 |

FOREIGN PATENT DOCUMENTS

| TW | 479201   |   | 3/2002  |
|---|---|---|---|
| TW | 557438   |   | 10/2003 |
| TW | 00557438 | * | 10/2003 |

* cited by examiner

*Primary Examiner*—Thomas Lee
*Assistant Examiner*—Jaweed A Abbaszadeh
(74) *Attorney, Agent, or Firm*—Winston Hsu

(57) ABSTRACT

A system for updating a basic input/output system (BIOS) includes a server (1) and a client computer (2) having a serial port (21). The server includes a storage (10) and a BIOS loading unit (11). The storage is used for storing customized strings, BIOS codes and a BIOS updating program. The BIOS loading unit is used for loading the customized strings, the BIOS codes and the BIOS updating program to the client computer through the serial port. The client computer includes a read only memory (ROM) (20) for storing the BIOS (200) of the client computer and a booting program (201). The booting program is used for initializing the serial port, receiving the customized strings, the BIOS codes and the BIOS updating program from the server, generating a checksum for checking the validity of the BIOS of the client computer, and executing the BIOS updating program to update invalid BIOS of the client computer. A related method is also disclosed.

8 Claims, 2 Drawing Sheets

SYSTEM AND METHOD FOR UPDATING A BASIC INPUT/OUTPUT SYSTEM

FIELD OF THE INVENTION

The present invention relates to systems and methods for updating a program of a computer system, and more particularly to a system and method for updating a basic input/output system (BIOS) of the computer system.

DESCRIPTION OF RELATED ART

Computer system manufacturers have long relied on configuring a number of operationals parameters of a computer system for maintaining normal operation of the computer system. Examples of such operating parameters configured with a plurality of configuration selectors include a bus/core ratio, a processor clock speed and other internal or external devices. Recently, system developers are beginning to rely on a basic input/output system (BIOS) to set a number of the operating parameters for the computer system. Examples of the BIOS configurable operating parameters include modes of a normal/update operation, password enable/disable, setup enable/disable and a number of extended system configuration parameters maintained in a complementary metal oxide semiconductor (CMOS) memory device.

However, with the extension of the role of BIOS, those skilled in the art will recognize that BIOS has become more complex. It is now typically embodied in more advanced forms of nonvolatile memory that are capable of update, such as electrically programmable read only memory (EPROM), electrically erasable programmable nonvolatile memory (EEPROM) and flash memory devices (e.g. flash EEPROM). In many of these prior art systems, the BIOS is updated by erasing the existing contents of the nonvolatile memory, and loading an updated BIOS from an update disk. In flash memory devices, this process is commonly referred to as "re-flashing." Those skilled in the art will recognize that with this added complexity of the BIOS and the devices within which they are stored, there is an increased likelihood that the BIOS will become corrupted.

The computer system may not boot when the BIOS has become corrupted. In order to update a corrupted BIOS or a current version of BIOS, many of the prior art systems require that the entire BIOS to be re-flashed with an updated BIOS, or that the entire nonvolatile memory to be replaced. Another prior art systems for updating BIOS utilize a network system. That is, client computers respectively download from a server computer loaded a new version of BIOS, and then re-flash the entire BIOS of the client computers. However, the network means for updating BIOS are inefficient, if the client computers are in abnormal state. Both prior arts are inefficient, time consuming and costly.

What is needed, therefore, is a system for updating a basic input/output system when a computer system is in abnormal state, which is unencumbered with the express and inherent limitations associated with the prior art solutions.

Similarly, what is also needed is a method for updating a basic input/output system when a computer system is in abnormal state, which is unencumbered with the express and inherent limitations associated with the prior art solutions.

SUMMARY OF INVENTION

A system for updating a basic input/output system (BIOS) in accordance with a preferred embodiment includes a server and a client computer having a serial port. The server is connected to the client computer through the serial port. The server includes a storage and a BIOS loading unit. The storage is used for storing customized strings, BIOS codes and a BIOS updating program. The BIOS loading unit is used for loading the customized strings, the BIOS codes and the BIOS updating program to the client computer through the serial port. The client computer includes a read only memory (ROM) and a booting program. The ROM is used for storing a BIOS and a booting program of the client computer. The booting program is used for initializing the serial port of the client computer, receiving the customized strings, the BIOS codes and the BIOS updating program from the server, generating a checksum for checking the validity of the BIOS of the client computer, and executing the BIOS updating program to update invalid BIOS of the client computer.

Another preferred embodiment provides a method for updating a basic input/output system (BIOS) in a computer by utilizing the above system. The method includes the steps: (a) providing a booting program in the client computer for initializing a serial port of the client computer; (b) providing a server connected to the client computer through the serial port, the server including a BIOS loading unit for transmitting customized strings to the client computer through the serial port; (c) determining whether the customized strings have been received by the client computer; (d) generating a checksum, if the customized strings have not been received by the client computer; or receiving the BIOS codes and the BIOS updating program from the server through the serial port, if the customized strings have been received by the client computer; (e) checking whether the BIOS of the client computer is valid according to the checksum; (f) receiving BIOS codes and a BIOS updating program from the server through the serial port if the BIOS is invalid; (g) executing the BIOS updating program to update the BIOS of the client computer; and (h) executing a power-on self-test (POST) program for routine checking of the client computer.

In summary, the system and method can update an invalid BIOS of a computer system when the computer system is in abnormal state, by means of utilizing a serial port for loading a valid BIOS to the computer.

Other advantages and novel features of the embodiments will be drawn from the following detailed description with reference to the attached drawings, in which:

DETAILED DESCRIPTION

Figure 1:
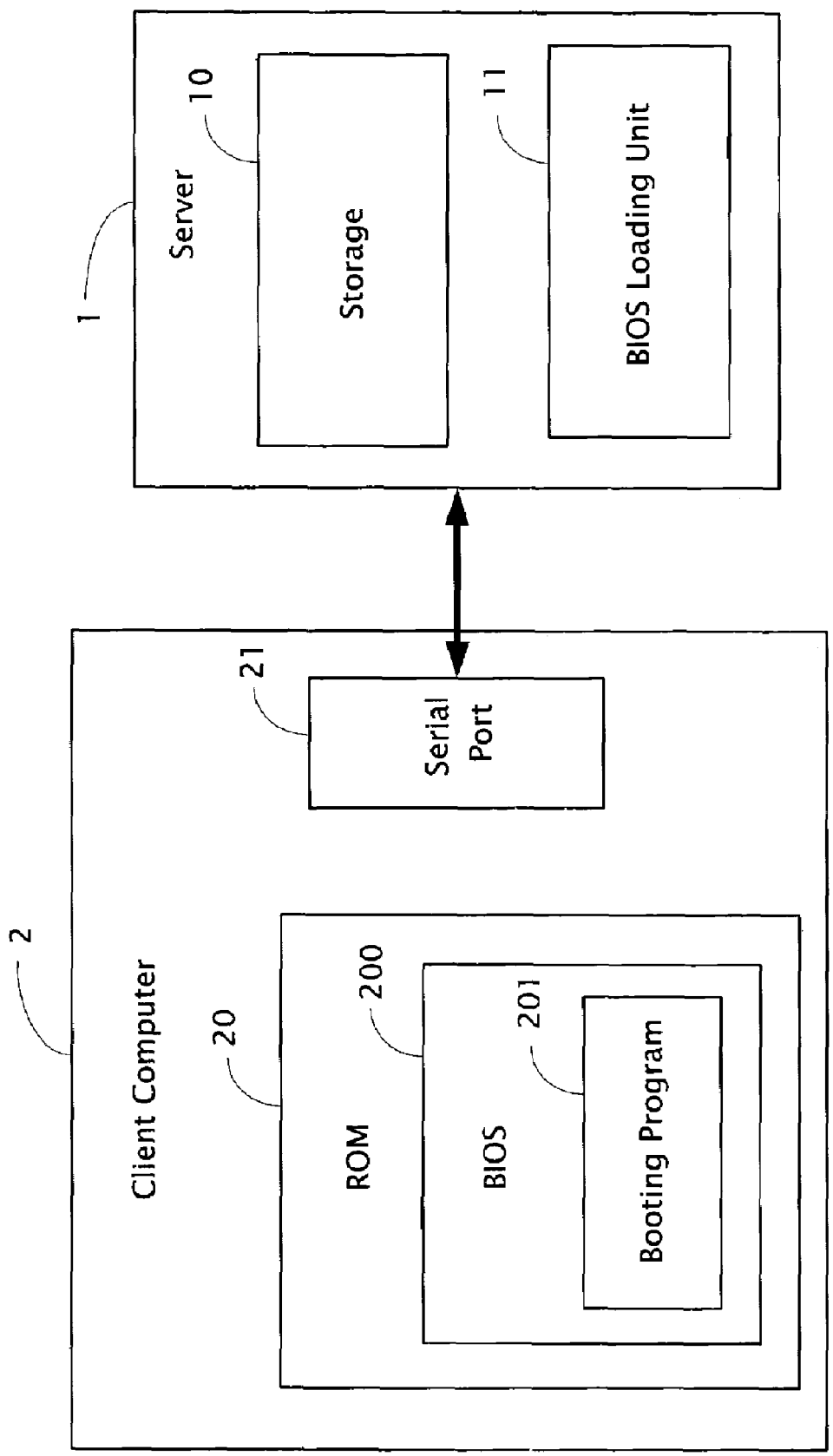
FIG. 1 is a schematic diagram of hardware infrastructure of a system for updating a basic input/output system in accordance with a preferred embodiment of the present invention.

FIG. 1 is a schematic diagram of hardware infrastructure of a system for updating a basic input/output system (hereinafter, "the system") in accordance with a preferred embodiment of the present invention. The system includes a server 1 and a computer 2. The server 1 is used for loading a BIOS updating program to the client computer 2 in order to update the BIOS of the client computer 2. The server 1 includes a storage 10 and a BIOS loading unit 11. The client computer 2 executes the BIOS updating program received from the server 1 to update its BIOS. The client computer 2 includes a read only memory (ROM) 20 and a serial port 21. The server 1 is connected to the client computer 2 through the serial port 21.

The storage 10 is used for storing customized strings, BIOS codes, and the BIOS updating program. The customized strings are used for controlling of updating the BIOS of the client computer 2. In the preferred embodiment of the present invention, the customized strings include four types of control commands: "SOH," "!," "S," and "#." The BIOS loading unit 11 is used for loading the customized strings, the BIOS codes, and the BIOS updating program to the client computer 2 through the serial port 21. The ROM 20 is used for storing a BIOS 200 and a booting program 201 of the client computer 2. The ROM 20 may be a nonvolatile memory, such as an electrically programmable read only memory (EPROM), an electrically erasable programmable nonvolatile memory (EE-PROM), or a flash memory (e.g. flash EEPROM). The booting program 201 is used for initializing the serial port 21, receiving the customized strings and the BIOS updating program from the server 1, and generating a checksum for checking the validity of the BIOS 200 of the client computer 2.

Figure 2:
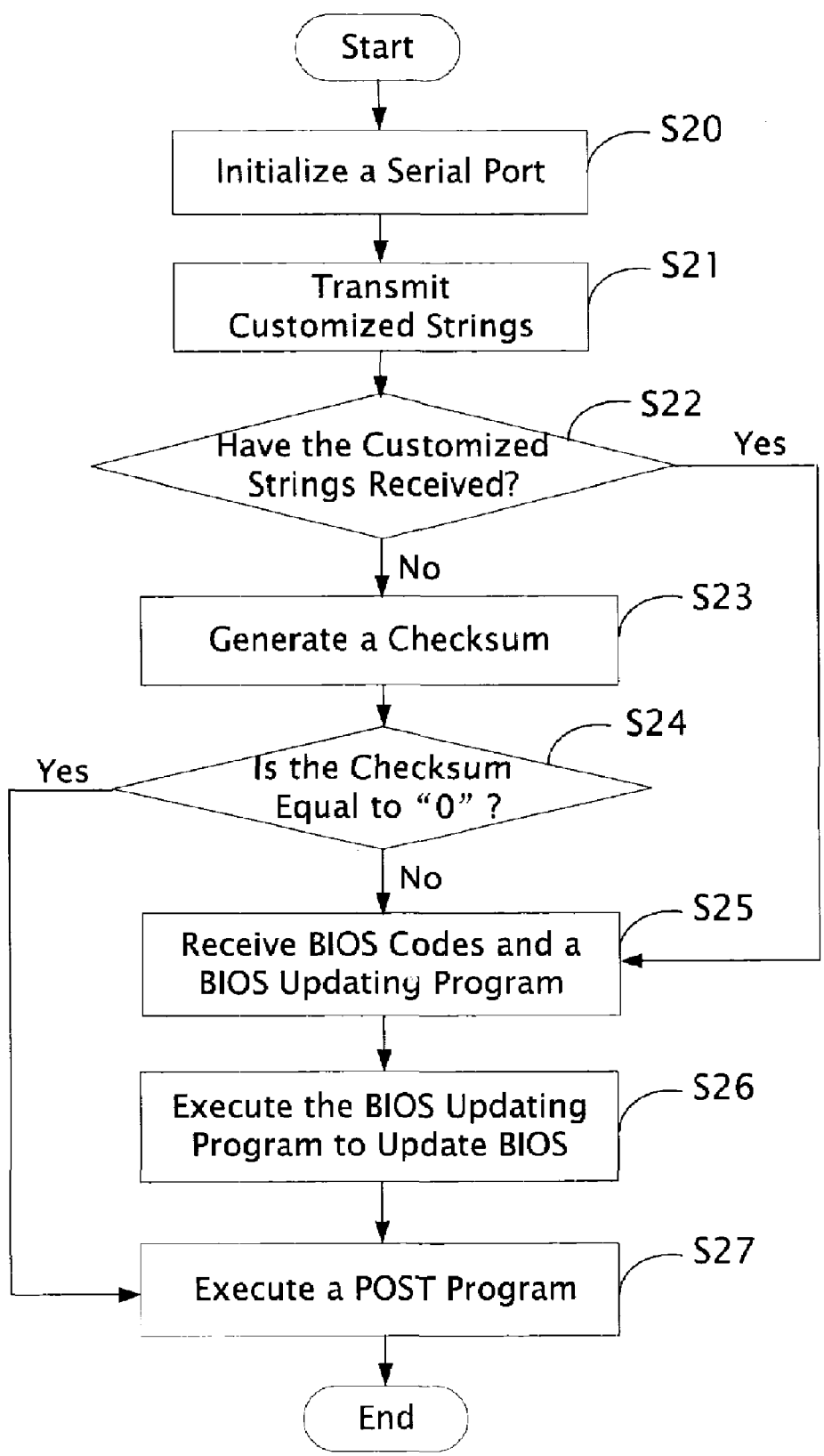
FIG. 2 is a flowchart of a preferred method for updating a basic input/output system by implementing the system of FIG. 1.

FIG. 2 is a flowchart of a preferred method for updating a basic input/output system by implementing the system. In step S20, the booting program 201 initializes the serial port 21 of the client computer 2, for receiving customized strings from the server 1. In step S21, the BIOS loading unit 11 of the server 1 transmits the customized strings to the client computer 2 through the serial port 21. In step S22, the booting program 201 determines whether the customized strings have been received, by means of checking the serial port 21 at intervals, such as for every 5 seconds. If the booting program 201 has received the customized strings, the procedure goes directly to step S25 described below. Otherwise, if the booting program 201 has not received the customized strings, in step S23, the booting program 201 generates a checksum for checking the validity of the BIOS 200 of the client computer 2. The checksum is calculated according to the following rules: the client computer 2 reads all data from the BIOS 200, adds every four bytes to get a plurality of values, and then adds up all the values to get the checksum. In step S24, the booting program 201 determines whether the checksum is equal to "0." If the checksum is equal to "0," which means the BIOS 200 is valid, the procedure goes directly to step S27 described below. Otherwise, if the checksum is not equal to "0," which means the BIOS 200 is invalid, in step S25, the booting program 201 receives the BIOS codes and the BIOS updating program from the server 1 through the serial port 21. In step S26, the booting program 201 executes the BIOS updating program to update the BIOS 200. Then in step S27, the client computer 2 executes a power-on self-test (POST) program for routine checking of hardware and software of the client computer 2.

Although the present invention has been specifically described on the basis of a preferred embodiment and preferred method, the invention is not to be construed as being limited thereto. Various changes or modifications may be made to the embodiment and method without departing from the scope and spirit of the invention.

What is claimed is:

1. A system for updating a basic input/output system (BIOS), the system comprising a server and a client computer having a serial port, wherein:
the server is connected to the client computer through the serial port, the server comprising:
a storage for storing customized strings, BIOS codes and a BIOS updating program; and
a BIOS loading unit for loading the customized strings, the BIOS codes and the BIOS updating program to the client computer through the serial port; and
the client computer comprises:
a booting program for initializing the serial port, determining whether the customized strings have been received by checking the serial port at intervals, receiving the customized strings, the BIOS codes and the BIOS updating program from the server, generating a checksum for checking the validity of the BIOS of the client computer, determining whether the BIOS of the client computer is valid according to the checksum, and executing the BIOS updating program to update the BIOS of the client computer if the BIOS of the client computer is invalid, wherein the checksum is generated by reading all data from the BIOS of the client computer, adding every four bytes of the data to obtain a plurality of values, and adding up all of the values to obtain the checksum.

2. The system according to claim 1, wherein the client computer further comprises a read only memory (ROM) for storing the BIOS of the client computer and the booting program.

3. A method for updating a basic input/output system (BIOS) in a client computer, the method comprising the steps of:
providing a booting program in the client computer for initializing a serial port of the client computer;
connecting a server to the client computer through the serial port, the server comprising a BIOS loading unit for transmitting customized strings to the client computer through the serial port;
determining whether the customized strings have been received by checking the serial port at intervals;
generating a checksum if the customized strings have not been received by the client computer, wherein the checksum is generated by reading all data from the BIOS of the client computer, adding every four bytes of the data to obtain a plurality of values, and adding up all of the values to obtain the checksum;
checking whether the BIOS of the client computer is valid according to the checksum;
receiving BIOS codes and a BIOS updating program from the server through the serial port if the BIOS of the client computer is invalid; and
executing the BIOS updating program to update the BIOS of the client computer if the BIOS of the client computer is invalid.

4. The method according to claim 3, further comprising the step of executing a power-on self-test (POST) program for routine checking of the client computer.

5. The method according to claim 3, wherein the step of determining whether the customized strings have been received by the client computer further comprises the step of: directly receiving the BIOS codes and the BIOS updating program from the server, if the customized strings have been received by the client computer.

6. The system according to claim 1, wherein the booting program is further for determining whether the customized strings have been received by the client computer.

7. The system according to claim 1, wherein the determination of whether the BIOS of the client computer is valid according to the checksum is by way of:
determining that the BIOS is valid when the checksum is equal to "0"; and
determining that the BIOS is invalid when the checksum is not equal to "0".

8. The method according to claim 3, wherein the step of checking whether the BIOS of the client computer is valid according to the checksum comprises:

determining that the BIOS is valid if the checksum is equal to "0"; or determining that the BIOS is invalid if the checksum is not equal to "0".

* * * * *